(12) United States Patent
Hirabayashi et al.

(10) Patent No.: US 7,745,371 B2
(45) Date of Patent: Jun. 29, 2010

(54) EXHAUST GAS PURIFYING CATALYST, METAL OXIDE PARTICLE AND PRODUCTION PROCESS THEREOF

(75) Inventors: Takeshi Hirabayashi, Toyota (JP); Oji Kuno, Toyota (JP); Masahide Miura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 368 days.

(21) Appl. No.: 10/588,603

(22) PCT Filed: Mar. 8, 2005

(86) PCT No.: PCT/JP2005/004403

§ 371 (c)(1),
(2), (4) Date: Aug. 7, 2006

(87) PCT Pub. No.: WO2005/084796

PCT Pub. Date: Sep. 15, 2005

(65) Prior Publication Data

US 2007/0179052 A1    Aug. 2, 2007

(30) Foreign Application Priority Data

Mar. 9, 2004    (JP) .................... 2004-065556

(51) Int. Cl.
*B01J 23/00*    (2006.01)
(52) U.S. Cl. ..................................... 502/304
(58) Field of Classification Search ........... None
See application file for complete search history.

(56) References Cited

U.S. PATENT DOCUMENTS

| 4,448,895 | A |   | 5/1984  | Ono et al.             |
|-----------|---|---|---------|------------------------|
| 4,981,825 | A | * | 1/1991  | Pinnavaia et al. ....... 502/63 |
| 5,182,249 | A |   | 1/1993  | Wang et al.            |
| 5,232,889 | A |   | 8/1993  | Blanchard et al.       |
| 5,334,570 | A |   | 8/1994  | Beauseigneur et al.    |
| 5,346,875 | A | * | 9/1994  | Wachter et al. ......... 502/233 |
| 5,352,646 | A |   | 10/1994 | Blanchard et al.       |

(Continued)

FOREIGN PATENT DOCUMENTS

CN    1060793 A    5/1992

(Continued)

OTHER PUBLICATIONS

John Dalton Wright et al., Sol- Gel Materials: Chemistry and Applications, 2001, CRC Press, Sect 1.4.*

(Continued)

*Primary Examiner*—Melvin C Mayes
*Assistant Examiner*—Stefanie Cohen
(74) *Attorney, Agent, or Firm*—Oliff & Berridge, PLC

(57) ABSTRACT

In order to provide an exhaust gas purifying catalyst having improved heat resistance and OSC, a metal oxide particle, and a production process of the metal oxide particle, a metal oxide particle having a core (1) where the total molar number of alumina and silica is larger than the molar number of ceria, and a surface layer (2) where the molar number of ceria is larger than the total molar number of alumina and silica is provided. Further, an exhaust gas purifying catalyst comprising the metal oxide particle and a noble metal supported on the metal oxide particle; and a production process of the metal oxide particle are provided.

4 Claims, 1 Drawing Sheet

U.S. PATENT DOCUMENTS

| | | | |
|---|---|---|---|
| 5,439,865 A | | 8/1995 | Abe et al. |
| 5,492,870 A | * | 2/1996 | Wilcox et al. ............... 501/80 |
| 5,607,892 A | | 3/1997 | Chopin et al. |
| 5,753,581 A | * | 5/1998 | Beckmeyer et al. ......... 502/304 |
| 6,083,868 A | * | 7/2000 | Yoshida et al. ............. 502/304 |
| 6,358,880 B1 | | 3/2002 | Hedouin et al. |
| 6,528,451 B2 | | 3/2003 | Brezny et al. |
| 6,773,814 B2 | | 8/2004 | Schumacher et al. |
| 6,911,414 B2 | | 6/2005 | Kimura et al. |
| 7,314,846 B2 | | 1/2008 | Kuno |
| 7,384,888 B2 | | 6/2008 | Kuno |
| 2002/0049137 A1 | | 4/2002 | Morikawa et al. |
| 2002/0098975 A1 | | 7/2002 | Kimura et al. |
| 2003/0007926 A1 | | 1/2003 | Jiang et al. |
| 2004/0082468 A1 | | 4/2004 | Suzawa et al. |
| 2004/0087440 A1 | | 5/2004 | Kuno |
| 2004/0186016 A1 | | 9/2004 | Bog et al. |
| 2005/0059547 A1 | | 3/2005 | Kuno |
| 2007/0129246 A1 | | 6/2007 | Miura |
| 2007/0179052 A1 | | 8/2007 | Hirabayashi et al. |
| 2007/0197373 A1 | | 8/2007 | Miura et al. |
| 2007/0197379 A1 | | 8/2007 | Miura |
| 2008/0051283 A1 | | 2/2008 | Miura |

FOREIGN PATENT DOCUMENTS

| | | | |
|---|---|---|---|
| DE | 94 03 581 U1 | | 6/1994 |
| EP | 0 430 744 A | | 6/1991 |
| EP | 0 524 643 A | | 1/1993 |
| EP | 1 175 935 A | | 1/2002 |
| EP | 1 284 277 A1 | | 2/2003 |
| EP | 1 371 415 A1 | | 12/2003 |
| EP | 1 415 956 A2 | | 5/2004 |
| EP | 1 516 855 A1 | | 3/2005 |
| EP | 1 579 912 A2 | | 9/2005 |
| FR | 2 836 067 A | | 8/2003 |
| JP | A-03-277060 | | 12/1991 |
| JP | A-06-279027 | | 10/1994 |
| JP | A 8-103650 | | 4/1996 |
| JP | A 8-109020 | | 4/1996 |
| JP | A 8-109021 | | 4/1996 |
| JP | A-9-255331 | | 9/1997 |
| JP | A 10-194742 | | 7/1998 |
| JP | 10258232 A | * | 9/1998 |
| JP | A 10-258232 | | 9/1998 |
| JP | A 2000-319019 | | 11/2000 |
| JP | A 2001-89143 | | 4/2001 |
| JP | A-2002-110261 | | 4/2002 |
| JP | A-2002-331238 | | 11/2002 |
| JP | A-2002-346386 | | 12/2002 |
| JP | A-2003-117393 | | 4/2003 |
| JP | A-2003-277060 | | 10/2003 |
| JP | A-2004-074138 | | 3/2004 |
| JP | A-2005-254047 | | 9/2005 |
| JP | A-2005-313024 | | 11/2005 |
| JP | A-2005-313028 | | 11/2005 |
| JP | A-2005-314134 | | 11/2005 |
| KR | 10-0295168 B1 | | 9/2001 |
| WO | WO 03/037506 A1 | | 5/2003 |
| WO | WO 2005/102933 A2 | | 11/2005 |
| WO | WO 2007/113674 A2 | | 10/2007 |

OTHER PUBLICATIONS

U.S. Appl. No. 10/593,629 filed on Sep. 21, 2006 in the name of Masahide Miura.
U.S. Appl. No. 10/589,669 filed on Aug. 16, 2006 in the name of Masahide Miura.
U.S. Appl. No. 12/451,089 tiled on Oct. 26, 2009 in the name of Masahide Miura.
U.S. Appl. No. 10/589,421 filed on Aug. 15, 2006 in the name of Masahide Miura.
Notice of Allowance issued in U.S. Appl. No. 10/589,421 on Sep. 18, 2009.
Office Action (Requirement for Restriction/Election) issued in U.S. Appl. No. 10/589,669 on Aug. 12, 2008.
Office Action (Non-Final Rejection) issued in U.S. Appl. No. 10/589,669 on Nov. 5, 2008.
Office Action (Final Rejection) issued in U.S. Appl. No. 10/589,669 on Apr. 28, 2009.
Office Action (Non-Final Rejection) issued in U.S. Appl. No. 10/589,669 on Nov. 18, 2009.
Office Action (Non-Final Rejection) issued in U.S. Appl. No. 10/589,421 on Sep. 17, 2008.
Office Action (Non-Final Rejection) issued in U.S. Appl. No. 10/589,421 on Apr. 14, 2009.
Aug. 19, 2005 Search Report issued in PCT/JP2005/008458.
Dec. 26, 2008 Office Action issued in Chinese patent application No. 200580013424.0.
Jul. 7, 2009 Office Action issued in Canadian patent application No. 2,562,556.
Aug. 10, 2005 Search Report issued in PCT/JP2005/008466.
Aug. 11, 2005 Search Report issued in PCT/JP2005/008465.

* cited by examiner

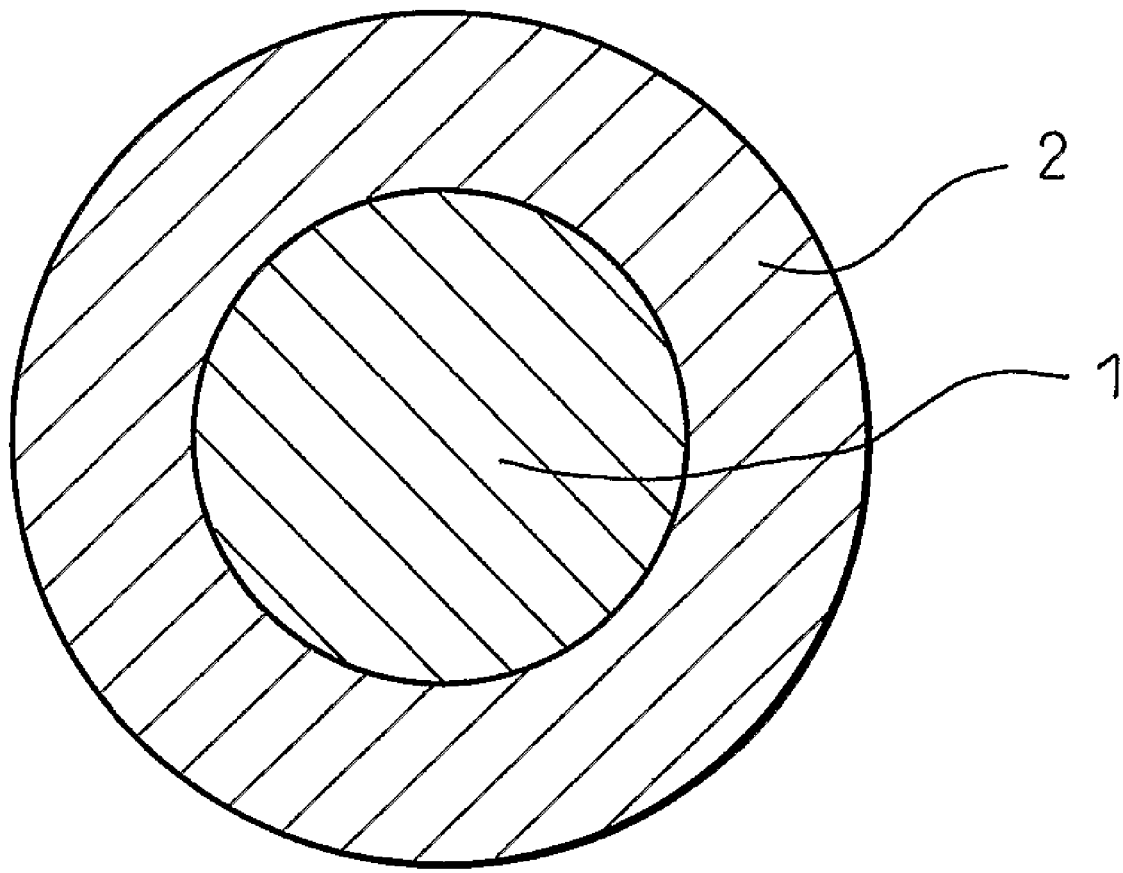

EXHAUST GAS PURIFYING CATALYST, METAL OXIDE PARTICLE AND PRODUCTION PROCESS THEREOF

TECHNICAL FIELD

The present invention relates to an exhaust gas purifying catalyst for purifying the components in an exhaust gas discharged from internal combustion engines, a metal oxide particle suitable as a carrier of the exhaust gas purifying catalyst, and a production process thereof.

BACKGROUND ART

The exhaust gas from internal combustion engines such as automobile engine contains nitrogen oxide ($NO_x$), carbon monoxide (CO), hydrocarbon (HC) and the like, and these substances are purified by an exhaust gas purifying catalyst and then released into air. As a representative exhaust gas purifying catalyst used therefor, a three-way catalyst where a noble metal such as platinum (Pt), rhodium (Rh) and palladium (Pd) is supported on a porous metal oxide carrier such as γ-alumina is known.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric ratio). When the internal combustion engine is operated in the condition of excess air for fuel (lean) or in the condition of excess fuel for air (rich), the three-way catalyst cannot satisfactorily exert its purifying effect.

Therefore, for absorbing the fluctuation of oxygen concentration in the exhaust gas and thereby elevating the exhaust gas purifying capacity of the three-way catalyst, a material having an oxygen storage capacity (OSC) for storing oxygen when the oxygen concentration in the exhaust gas is high, and releasing oxygen when the oxygen concentration in the exhaust gas is low, is used for the exhaust gas purifying catalyst. A representative material having OSC is ceria ($CeO_2$).

It is known that the OSC of ceria is enhanced when ceria is used together with zirconia to form a ceria-zirconia composite oxide (see, Japanese Unexamined Patent Publication No. 8-103650, 8-109020, 8-109021, 2000-319019, and 2001-89143). By this formation of ceria into a composite oxide, the heat resistance of ceria is improved, but sufficiently high heat resistance is not yet obtained.

In Japanese Unexamined Patent Publication No. 10-194742, zirconium hydroxide is used as the zirconia source for improving the heat resistance of the ceria-zirconia composite oxide.

In Japanese Unexamined Patent Publication No. 10-258232, a catalyst for exhaust gas purification having improved sulfur-poisoning resistance and heat resistance is provided. The catalyst comprises a core part made of alumina/titania complex oxide and NOx storage material, and a catalyst-carrying layer thereon made of a metal oxide complex comprising alumina and a catalytic noble metal.

The present invention provides an exhaust gas purifying catalyst having OSC and an improved heat resistance, a metal oxide particle, and a production process of the metal oxide particle.

According to studies in recent years, it has been found that the ceria not only has OSC but also, by virtue of its strong affinity for platinum, prevents particle growth (sintering) of platinum supported on ceria and in turn reduction of the exhaust gas purifying capacity. Therefore, if ceria is used in the form of a ceria-zirconia composite metal oxide as in conventional techniques, the platinum is randomly supported on both ceria and zirconia constituting the composite metal oxide surface, and the ceria cannot fully exert its ability of preventing platinum from sintering.

The present invention provides an exhaust gas purifying catalyst and metal oxide particle, having an effect of preventing platinum from sintering as well as heat resistance and OSC, and a production process of the metal oxide particle.

Incidentally, the above-described problems are partially solved also by the zirconium particle having a ceria surface which is proposed by the present inventors in Japanese Unexamined Patent Publication No. 2004-141833 (published after the priority date of the present application).

DISCLOSURE OF THE INVENTION

The exhaust gas purifying catalyst of the present invention comprises a metal oxide particle containing ceria and at least either one of alumina and silica, and a noble metal, particularly platinum, supported on the metal oxide particle. The metal oxide particle has a core where the total molar number of alumina and silica is larger than the molar number of ceria, and a surface layer where the molar number of ceria is larger than the total molar number of alumina and silica. Particularly, the metal oxide particle in the exhaust gas purifying catalyst of the present invention is formed from a solution containing a ceria sol and a sol of at least either one of alumina and silica. Also, in particular, the metal oxide particle has a particle size of 500 nm or less.

According to this catalyst, the heat resistance of the exhaust gas purifying catalyst having OSC owing to ceria is improved by virtue of the core rich in at least either one of alumina and silica.

Also, when the noble metal used in the exhaust gas purifying catalyst of the present invention is platinum, the exhaust gas purifying catalyst of the present invention can have a platinum sintering-preventing effect attributable to the ceria surface, in addition to the heat resistance by virtue of the core rich in at least either one of alumina and silica, as well as OSC owing to ceria.

The metal oxide particle of the present invention has a core where the total molar number of alumina and silica is larger than the molar number of ceria, and a surface layer where the molar number of ceria is larger than the total molar number of alumina and silica. Particularly, the metal oxide particle of the present invention is formed from a solution containing a ceria sol and a sol of at least either one of alumina and silica. Also, in particular, the metal oxide particle has a particle size of 500 nm or less.

According to this metal oxide particle, the heat resistance of the metal oxide particle having OSC owing to ceria is improved by virtue of the core rich in at least either one of alumina and silica. Also, when platinum is supported on the metal oxide particle of the present invention, the metal oxide particle can have a platinum sintering-preventing effect attributable to the ceria surface, in addition to the heat resistance by virtue of the core rich in at least either one of alumina and silica as well as OSC owing to ceria.

The process of the present invention for producing a metal oxide particle having a core where the total molar number of alumina and silica is larger than the molar number of ceria, and a surface layer where the molar number of ceria is larger than the total molar number of alumina and silica, comprises preparing a solution containing a ceria sol and a sol of at least either one of alumina and silica, adjusting the pH of the solution to be closer to the isoelectric point of the sol of at least either one of alumina and silica than to the isoelectric point of the ceria sol, particularly, adjusting the pH to fall within ±2, preferably ±1, more preferably ±0.5, of the isoelectric point of the sol of at least either one of alumina and silica, and aggregating the sol from the solution to produce an aggregate.

According to this process, a metal oxide particle having a core where the total molar number of alumina and silica is larger than the molar number of ceria, and a surface layer where the molar number of ceria is larger than the total molar number of alumina and silica, can be produced particularly in a fine particle size.

According to the present invention, an exhaust gas purifying catalyst having improved heat resistance and OSC, a metal oxide particle, and a production process of the metal oxide particle are provided.

BRIEF DESCRIPTION OF DRAWINGS

FIG. 1 is a cross-sectional view of the metal oxide particle of the present invention.

BEST MODE FOR CARRYING OUT THE INVENTION

As shown in FIG. 1, the metal oxide particle of the present invention has a core 1 rich in alumina and/or silica, and a surface layer 2 rich in ceria.

The metal oxide particle used in the exhaust gas purifying catalyst of the present invention can be obtained by a process comprising preparing a solution containing a ceria sol and a sol of at least either one of alumina and silica, adjusting the pH of this solution to be closer to the isoelectric point of the sol of at least either one of alumina and silica than to the isoelectric point of the ceria sol, and aggregating the sol from the solution, for example by concentrating the solution, to produce an aggregate. This aggregate is further dried and fired, whereby the metal oxide particle of the present invention can be obtained.

The thus-obtained metal oxide particle of the present invention preferably has a small particle size so as to obtain a large surface area, and for example, has a particle size of 500 nm or less, 200 nm or less, 100 nm or less, or 50 nm or less. In this way, the metal oxide particle is fine and the ceria-rich layer becomes thin, so that the OSC and heat resistance can be enhanced.

The metal oxide particle of the present invention may also be obtained by mixing alumina and/or silica particles with a ceria sol and/or a ceria salt solution, and subjecting the mixture to drying, firing and the like, thereby coating ceria on the surface of the metal oxide powder. However, in the case of coating ceria on the surface of a metal oxide particle, as generally available metal oxide particles have a size of several μm or more, the metal oxide particle obtained by coating ceria on the periphery of such a metal oxide particle comes to have an average particle size as large as several μm or more.

On the other hand, in the case of producing the metal oxide particle of the present invention by using a solution containing a ceria sol and a sol of at least either one of alumina and silica, a fine particle having a very small average particle size can be obtained. When a noble metal is supported on the surface of such a metal oxide particle, the noble metal can be supported in a highly dispersed state. For example, in the case where the sol actually used as a raw material has an average particle size of about 5 nm, the metal oxide particle synthesized by the process of the present invention can have an average particle size of 50 nm or less, whereas the metal oxide particle produced by grinding a metal oxide block generally has an average particle size of 1 μm or more.

In the process for producing a metal oxide particle of the present invention, the pH of the solution containing a ceria sol and a sol of at least either one of alumina and silica is adjusted to be closer to the isoelectric point of the sol of at least either one of alumina and silica. With such a pH, the zeta potential on the particle surface of the sol of at least either one of alumina and silica becomes small, and this allows for less generation of electrical repulsion between the alumina and/or silica sol particles and facilitates aggregation of the sol. If the pH of the solution is distant from the isoelectric point of the ceria sol, the ceria sol comes to have a large zeta potential and electrical repulsion is generated between ceria sol particles and, as a result, aggregation of sol particles becomes difficult.

When the sol is aggregated in the above-described state by, for example, concentrating the metal oxide solution, the alumina and/or silica sol is aggregated to (1) form alumina and/or silica particles and thereafter, (2) ceria deposits on the surface of such a particle. The thus-obtained metal oxide particle is dried and fired, whereby a metal oxide particle having (1) a core rich in alumina and/or silica and (2) a surface layer rich in ceria can be obtained. The metal oxide particle obtained through aggregation of a sol according to the process of the present invention can have a small particle size, for example, a particle size of 500 nm or less, 200 nm or less, 100 nm or less, or 50 nm or less.

The exhaust gas purifying catalyst of the present invention can be produced by loading a noble metal on a carrier which is the metal oxide particle of the present invention. Examples of the noble metal which can be loaded include Pt, Rh, Pd, Ir and Ru. Among these, platinum is preferred because ceria has high affinity for platinum and prevents platinum from sintering. The amount of the noble metal supported on the metal oxide particle is generally from 0.01 to 5 mass %, preferably from 0.1 to 2 mass %, based on the metal oxide particle.

The term "sol" in "alumina sol", "silica sol" and "ceria sol" for use in the production of the metal oxide particle of the present invention means a material which is a colloid solution of metal oxide or metal hydrate dispersed in a liquid such as water, organic dispersion medium (e.g., alcohol, acetylacetone), particularly in water, and when fired after removal of the dispersion medium, produces an oxide of the metal. Specific examples of the sol include material obtained by hydrolyzing and condensing alkoxide, acetylacetonate, acetate, nitrate or the like of the metal in a solution. These sols are known materials and are commercially available.

The isoelectric point of the sol can be measured according to the stopwatch method which is electrophoretic microscopy described in JIS R1638.

The pH of the raw material sol can be adjusted by adding an arbitrary acid or alkali. The acid is preferably a mineral acid such as nitric acid and/or hydrochloric acid, and the alkali is preferably aqueous ammonia and/or sodium hydroxide.

The metal oxide sol commercially available is usually adjusted to a pH of causing no aggregation of the metal oxide. That is, the commercially available sol generally has a pH distant from the isoelectric point of the sol, whereby the sol is prevented from production of a precipitate.

In the case of precipitating alumina and/or silica from the raw material sol, the pH of the sol is preferably made coincident with the isoelectric point of the alumina and/or silica sol, but this is very difficult in view of practical operation. Accordingly, it is sufficient if the pH of the raw material sol is adjusted to a value closer to the isoelectric point of the alumina and/or silica sol than to the isoelectric point of the ceria sol, For example, the pH may be adjusted to fall within ±2.0, preferably ±1.0, more preferably ±0.5, of the isoelectric point of alumina and/or silica sol.

The pH of the raw material sol may be adjusted, for example by a method of adding an acid or an alkali to the raw material sol while measuring the pH of the raw material sol by a pH meter, or by a method of measuring the amount of acid or alkali necessary for the pH adjustment by using a previously sampled raw material sol, and adding an acid or alkali in an amount determined by calculation based on the measured amount, to the entire raw material sol.

The metal oxide particle of the present invention contains ceria and at least either one of alumina and silica but may contain one or multiple metal oxide(s) other than those metals. For example, the metal oxide particle of the present invention can be obtained from a solution containing an alumina and/or silica sol and a ceria sol, and further containing a sol and/or a salt of a metal other than those metals. The metal other than Al, Si and Ce may be arbitrarily selected from the group consisting of s-block metals, d-block metals, p-block metals and f-block metals. Specific examples thereof include Na, K, Mg, Ca, Ba, Sr, La, Y, Pr, Nd, Sm, Eu, Gd, Ti, Zr, Sn, Mn, Fe, Co, Ni, Cr, Nb, Cu, V, Mo, W, Zn and Ta.

The mixing ratio among the alumina and/or silica sol, the ceria sol, and the salt and/or sol of another metal can be freely selected but, in order to maintain the heat resistance, (Al+Si) and Ce in the metal oxide particle of the present invention are preferably on the same level, for example, the molar ratio therebetween may be from 1:0.5 to 0.5:1, from 1:0.8 to 0.8:1, or about 1:1. In the case where the meal oxide particle of the present invention contains a metal other than Al, Si and Ce, the molar ratio of (Al+Si+Ce):another metal in the metal oxide particle of the present invention may be from 5:1 to 20:1, from 8:1 to 10:1, or about 9:1.

The removal of the dispersion medium from the raw material sol and the subsequent drying may be performed by a freely selected method at an arbitrary temperature. For example, the removal of dispersion medium and the drying may be performed by placing the raw material sol in an oven at 120° C.

The raw material obtained by drying the raw material sol after removal of the dispersion medium is fired, whereby the metal oxide particle can be prepared. The firing may be performed at a temperature generally employed in the synthesis of metal oxides, for example at 500° C. or more (e.g., from 500 to 1,100° C.).

The metal oxide particle of the present invention can be formulated such that when measured by X-ray photoelectron spectrometry (XPS), ceria is covering more than 55 mol %, preferably more than 70 mol %, more preferably more than 80 mol %, of the surface of the metal oxide particle.

The exhaust gas purifying catalyst of the present invention may also be used by coating it on a monolith support, for example, a ceramic-made honeycomb.

The present invention is described in greater detail below by referring to Examples.

EXAMPLES

Example 1

Pt (2 wt %)/$CeO_2$-Surface $Al_2O_3$ Catalyst

A ceria sol containing 15 wt % of $CeO_2$ and an alumina sol containing 10 wt % of $Al_2O_3$ were mixed to give a molar ratio of 1:1 between Ce and Al, whereby a raw material sol was obtained. Here, the isoelectric point of alumina sol was about 4.2, and the isoelectric point of the ceria sol was about 7.7.

The pH of this raw material sol was adjusted to 4 by adding, dropwise, nitric acid and after drying it at 120° C. for 24 hours, the obtained product was fired at 700° C. for 5 hours. The thus-obtained metal oxide was dispersed in water, a dinitrodiamine platinum solution was added thereto, and the resulting solution was stirred for 2 hours, dried at 120° C. and fired at 500° C. for 2 hours to obtain a catalyst (referred to as "Pt (2 wt %)/$CeO_2$-surface $Al_2O_3$ catalyst") where a $CeO_2$ surface layer and an $Al_2O_3$ core were present and Pt was supported in an amount of 2 wt % based on the weight of these oxides. For the purpose of use in tests, the obtained catalyst was compression-molded into 1 mm-square pellets.

Example 2

Pt (2 wt %)/$CeO_2$-Surface $SiO_2$ Catalyst

A catalyst (referred to as "Pt (2 wt %)/$CeO_2$-surface $SiO_2$ catalyst") where a $CeO_2$ surface layer and a $SiO_2$ core were present and Pt was supported in an amount of 2 wt % based on the weight of these oxides, was obtained in the same manner as in Example 1 except for replacing the alumina sol by a silica sol containing 10 wt % of $SiO_2$. Here, the isoelectric point of silica sol was about 2.9. This catalyst was formed into 1 mm-square pellets in the same manner as Example 1 and used for tests.

Comparative Example 1

Pt (2 wt %)/$CeO_2$ Catalyst

The ceria sol used in Example 1 was dried at 120° C. for 24 hours, and the obtained product was fired at 700° C. for 5 hours to obtain $CeO_2$. Thereafter, a $CeO_2$ catalyst having supported thereon 2 wt % of Pt (referred to as "Pt (2 wt %)/$CeO_2$ catalyst") was obtained in the same manner as in Example 1. This catalyst was formed into 1 mm-square pellets in the same manner as Example 1 and used for tests.

Comparative Example 2

Pt (2 wt %)/$Al_2O_3$ Catalyst

The alumina sol used in Example 1 was dried at 120° C. for 24 hours, and the obtained product was fired at 700° C. for 5 hours to obtain $Al_2O_3$. Thereafter, an $Al_2O_3$ catalyst having supported thereon 2 wt % of Pt (referred to as "Pt (2 wt %)/$Al_2O_3$ catalyst") was obtained in the same manner as in Example 1. This catalyst was formed into 1 mm-square pellets in the same manner as Example 1 and used for tests.

Comparative Example 3

Pt (2 wt %)/($CeO_2$+$Al_2O_3$) Catalyst

The $CeO_2$ and $Al_2O_3$ obtained in Comparative Examples 1 and 2 were mixed such that the molar ratio of Ce and Al was 1:1. Thereafter, a $CeO_2$ and $Al_2O_3$ mixed catalyst having supported thereon 2 wt % of Pt (referred to as "Pt (2 wt %)/($CeO_2$+$Al_2O_3$) catalyst") was obtained in the same manner as in Example 1. This catalyst was formed into 1 mm-square pellets in the same manner as Example 1 and used for tests.

Comparative Example 4

Pt (2 wt %)/$CeO_2$-Surface $ZrO_2$ Catalyst

A catalyst (referred to as "Pt (2 wt %)/$CeO_2$-surface $ZrO_2$ catalyst") where a $CeO_2$ surface layer and a $ZrO_2$ core were present and Pt was supported in an amount of 2 wt % based on the weight of these oxides, was obtained in the same manner as in Example 1 except for replacing the alumina sol by a zirconia sol containing 10 wt % of $ZrO_2$. This catalyst was formed into 1 mm-square pellets in the same manner as Example 1 and used for tests.

Evaluation of Catalyst

An endurance treatment at 800° C. over 5 hours was performed by changing over between a rich atmosphere gas and a lean atmosphere every one minute. The rich and lean gases have the compositions shown in Table 1.

TABLE 1

Gas Composition for Endurance Treatment

| | $N_2$ (%) | $CO_2$ (%) | NO (ppm) | CO (%) | $C_3H_6$ (ppmC) | $H_2$ (%) | $O_2$ (%) | $H_2O$ (%) |
|---|---|---|---|---|---|---|---|---|
| Rich gas | bal. | 10 | 2200 | 2.80 | 2500 | 0.27 | 0.77 | 10 |
| Lean gas | bal. | 10 | 2200 | 0.81 | 2500 | 0 | 1.7 | 10 |

The catalysts of Examples 1 and 2 and Comparative Examples 1 to 4 were evaluated for performance by passing an evaluation gas having the composition shown in Table 2 below at 400° C. for 20 minutes and thereafter, lowering the temperature to 150° C. In each test, the total gas flow rate was 6.0 L/min and the amount of catalyst was 1.5 g. The performance of catalyst was determined on the specific surface area (denoted as "SSA") of catalyst by BET one-point method, the Pt particle size determined by CO pulse adsorption method at −80° C., and the temperature (denoted as "HC-T50") where the HC purification ratio (HC concentration in outlet gas/HC concentration in inlet gas) reached 50%.

TABLE 2

Evaluation Gas Composition

| | $N_2$ (%) | $CO_2$ (%) | NO (ppm) | CO (%) | $C_3H_6$ (ppmC) | $H_2$ (%) | $O_2$ (%) | $H_2O$ (%) |
|---|---|---|---|---|---|---|---|---|
| Stoichiometric | bal. | 10 | 1500 | 0.65 | 1000 | 0 | 0.7 | 5 |

Results obtained in the evaluation of catalyst are shown in Table 3 below.

TABLE 3

Evaluation Results of Catalyst Activity After Endurance Treatment at 800° C.

| | Catalyst | Ce:(Al or Si or Zr) (molar ratio) | SSA ($m^2$/g) | Particle Size of Pt (nm) | HC-T50 (° C.) |
|---|---|---|---|---|---|
| Example 1 | Pt (2 wt %)/$CeO_2$-surface $Al_2O_3$ catalyst | 50:50 | 121 | 1.3 | 216 |
| Example 2 | Pt (2 wt %)/$CeO_2$-surface $SiO_2$ catalyst | 50:50 | 145 | 1.4 | 218 |
| Comparative Example 1 | Pt (2 wt %)/$CeO_2$ catalyst | 100:0 | 8 | 6.2 | 325 |
| Comparative Example 2 | Pt (2 wt %)/$Al_2O_3$ catalyst | 0:100 | 130 | 24.2 | 356 |
| Comparative Example 3 | Pt (2 wt %)/($CeO_2$ + $Al_2O_3$) catalyst | 50:50 | 77 | 15.6 | 329 |
| Comparative Example 4 | Pt (2 wt %)/$CeO_2$-surface $ZrO_2$ catalyst | 50:50 | 36 | 4.6 | 288 |

As apparent from Table 3, the catalysts of Examples 1 and 2 of the present invention, after an endurance treatment, have a relatively large specific surface area comparable to that of alumina used alone and maintain a small Pt particle size. Also, in the catalysts of Examples 1 and 2 of the present invention, the HC 50% purification temperature (HC-T50) is relatively low and this reveals that the catalysts works from a lower temperature.

The invention claimed is:

1. A process for producing a metal oxide particle having a core where the total molar number of alumina and silica is larger than the molar number of ceria, and a surface layer where the molar number of ceria is larger than the total molar number of alumina and silica, said process comprising:
   preparing a solution containing a ceria sol and a sol of at least either one of alumina and silica, wherein the isoelectric point of the ceria sol differs more than 3.5 from that of said at least one of alumina and silica sol,
   adjusting the pH of said solution to be closer to the isoelectric point of the sol of at least either one of alumina and silica than to the isoelectric point of the ceria sol, and to fall within and ±2.0 of the isoelectric point of alumina and/or silica sol, and
   aggregating the sol from said solution to produce an aggregate.

2. The process according to claim 1, wherein the molar ratio of (Al+Si):Ce in the metal oxide particle is from 1:0.5 to 0.5:1.

3. The process according to claim 1, wherein the pH of said solution is adjusted to be closer to the isoelectric point of the sol of at least either one of alumina and silica than to the isoelectric point of the ceria sol, and to fall within ±0.5 of the isoelectric point of alumina and/or silica sol.

4. A process for producing an exhaust gas purifying catalyst, wherein the process comprises producing a metal oxide particle by the process according to claim 1, and then loading a noble metal on said metal oxide particle.

* * * * *